United States Patent
Druschel et al.

(10) Patent No.: US 7,845,927 B2
(45) Date of Patent: Dec. 7, 2010

(54) FLEXIBLE LIP EXTRUDER, AND METHODS

(75) Inventors: Robert L. Druschel, Eau Claire, WI (US); Steven D. Jonjak, Chippewa Falls, WI (US)

(73) Assignee: Premier Dies Corporation, Chippewa Falls, WI (US)

( * ) Notice: Subject to any disclaimer, the term of this patent is extended or adjusted under 35 U.S.C. 154(b) by 840 days.

(21) Appl. No.: 11/765,005

(22) Filed: Jun. 19, 2007

(65) Prior Publication Data
US 2007/0290398 A1 Dec. 20, 2007

Related U.S. Application Data

(60) Provisional application No. 60/805,111, filed on Jun. 19, 2006.

(51) Int. Cl.
*B29C 47/16* (2006.01)
(52) U.S. Cl. .................. 425/192 R; 425/381; 425/466
(58) Field of Classification Search ............. 425/192 R, 425/381, 466
See application file for complete search history.

(56) References Cited

U.S. PATENT DOCUMENTS

| 2,720,679 | A | * | 10/1955 | Ratliff | 425/307 |
| 3,323,169 | A | * | 6/1967 | Vitellaro | 425/162 |
| 3,829,274 | A | * | 8/1974 | Melead | 425/466 |
| 4,863,361 | A | * | 9/1989 | Boos | 425/141 |
| 5,679,383 | A | | 10/1997 | Ryan et al. | |
| 5,679,383 | A | | 1/1999 | Ryan et al. | |
| 6,017,207 | A | | 1/2000 | Druschel et al. | |
| 6,287,105 | B1 | | 9/2001 | Druschel et al. | |
| 6,663,375 | B1 | * | 12/2003 | Ulcej | 425/141 |

* cited by examiner

*Primary Examiner*—Yogendra N Gupta
*Assistant Examiner*—Joseph Leyson
(74) *Attorney, Agent, or Firm*—Kagan Binder, PLLC (57) ABSTRACT

An extrusion die or extruder having a flexible lip that is moveable by a geared mechanism. A shaft is operably connected to at least one gear, which in turn is operably connected to a movable lip of the extruder. Rotation of the shaft results in movement of the extruder lip.

16 Claims, 7 Drawing Sheets

FLEXIBLE LIP EXTRUDER, AND METHODS

REFERENCE TO RELATED PATENT APPLICATION

The patent application claims the benefit of U.S. Provisional Patent Application No. 60/805,111, filed on Jun. 19, 2006, the entire disclosure of which is incorporated herein by reference.

FIELD OF THE DISCLOSURE

The present disclosure relates to flexible lip extrusion apparatus or extruders.

BACKGROUND OF THE DISCLOSURE

For years, extrusion dies (also known as extruders) have been provided with various mechanical means for adjusting the die lip gap in order to provide a film or sheet with a controlled, and adjustable, thickness. Typically, the lip of the extruder includes a degree of flexibility, often from a slideable portion. In some older designs, a plurality of bolts spaced apart from each other along the lip control the lip gap along the lip. Adjusting the individual lip bolts involves considerable skill, takes time and adds to the cost of production.

Use of thermal expansion and contraction of lip-adjusting components has been described in various references; see for example, U.S. Pat. No. 3,940,221 to Nissel, U.S. Pat. No. 4,753,587 to Djordjevic, et al, and U.S. Pat. No. 5,208,047 to Cloeren, et al. Newer approaches for adjusting the lip gap include using an adjustable, hinged lip; various examples are described in U.S. Pat. Nos. 5,679,383 and 5,962,041 to Ryan et al., U.S. Pat. No. 6,017,207 to Druschel, and U.S. Pat. No. 6,287,105 to Druschel et al.

The approach of Ryan et al. is to use a generally laterally movable block or bar, which extends laterally across the extruder parallel with the lip, the block having one or more angled cam blocks extending therefrom. A lip adjustment block is coupled to the lip to be moved (usually the bottom lip) which includes one or more angled grooves or recesses sized to closely receive the cam blocks for sliding movement therein. A threaded stud extends axially from one end of the angle block through a hole in an end plate and is received by a complementarily threaded spool. Rotation of the spool results in generally lateral movement of the angle block and in single point adjustment of the lip gap.

This approach may solve many problems of conventional dies, however, the lip adjustment block and the corresponding angle block are difficult to manufacture. Because the cam blocks of the angle block fit into the angled grooves of the block and the entire lengths must fit perfectly, accurate machining is required. This difficulty increases with increased length. Likewise, replacement and repair of these components is expensive and time consuming, and because of the interfit, it may be necessary to remove both components.

In addition, the lengths of the lip adjustment block and angle block cause other problems. A lengthy component may tend to warp, and because of thermal expansion and retraction, the possibility of warping is increased. Moreover, long pieces (e.g., of sixty inches or more) usually require greater machining clearance for the pieces to mate properly, which may result in non-uniformity along the die lip. Furthermore, rotation of the spool can be difficult if the long pieces do not properly fit and align. If so, costly oversized or special thread forms may be necessary.

The improved approach of the Druschel and Druschel et al. references is to also use a generally laterally movable block or bar (referred to as an actuator bar), which extends laterally across the extruder parallel with the lip. This bar includes a plurality of pins attached thereto, which engage with angled slots in perpendicularly arranged slideable blocks. Multiple blocks slideably engage the lip. As the actuator bar is slid, each pin is slid within the slot, thus moving the slideable block in a direction transverse to the direction of movement of the actuator bar. A stud extends axially from one end of the actuator bar through a hole in an end plate. A spool, threaded over the stud, rotates, thus moving the stud with a generally linear movement that in turn moves the actuator bar and provides single point adjustment of the lip gap. Druschel et al. modify the adjustment mechanism by providing a geared assembly remote from, but connected to the extruder, to facilitate rotation of a gear connected to a stud, in order to provide linear movement of the actuator bar.

There is always room for improvements.

SUMMARY OF THE DISCLOSURE

In general, the present disclosure relates to an extrusion die or extruder having a flexible lip that is moveable by a geared mechanism. In particular, a shaft is operably connected to at least one gear, which is in turn operably connected to a moveable lip of the extruder. Rotation of the shaft results in movement of the extruder lip.

In one particular aspect, this disclosure is directed to an extruder that has a body having a flexible lip that at least partially defines a gap. In some embodiments, the extruder may have two bodies, each which has a flexible lip that together define the gap. The extruder also includes a moveable member operably connected to the flexible lip for adjustment of the gap, a pin engaged with the moveable member, a gear configured to receive the pin offset from a center point of the gear, and a shaft configured to engage and rotate the gear. The shaft may be a geared shaft. A worm gear is an example of a suitable gear and a worm shaft is an example of a suitable shaft. In some embodiments, the shaft may be composed of a plurality of shorter shafts.

In some embodiments, the moveable member has a slot therein, the slot receiving a head portion of the pin. The end portion of the pin seats rotatably within a hole of the gear, the hole being offset from the center of the gear.

The extruder may have a plurality of moveable members, and spacers that separate the moveable members and define areas in which the moveable members are positioned. These spacers may be attached to the body of the extruder. A cover plate may be positioned over the moveable members and/or spacers to lock them into position.

In another particular aspect, this disclosure is directed to an extruder that has at least one body having a first flexible lip partially defining a gap, a plurality of moveable members operably connected to the first flexible lip for adjustment of the gap, a plurality of pins each partially positioned within each moveable member, a plurality of gears each configured to receive one pin, the pin being offset from the center point of each gear, and a geared shaft configured to engage and rotate each gear. The gears may be worm gears and the shaft may be a worm shaft. In some embodiments, the shaft may be composed of a plurality of shorter shafts.

In yet another particular aspect, this disclosure is directed to an extruder that has a body having a flexible lip at least partially defining a gap, a hinge allowing movement of the flexible lip relative to the body, at least one moveable member operably connected to the flexible lip for adjustment of the gap, the moveable member having a slot, the slot being configured to receive a head portion of the pin and extending horizontally along a length, a spacer separating adjacent the moveable members and defining areas in which the moveable member is disposed, a pin partially positioned within the moveable member, the pin having a head portion received in the slot of the moveable member, a worm gear configured to receive an end of the pin offset from the center point of the worm gear, a worm shaft configured to engage and rotate the worm gear, and an adjustment spool operably connected to the worm shaft.

This disclosure is also directed to a method of extruding material, the method comprising rotating a geared shaft to turn a worm gear, in turn rotating a worm gear to drive a pin in an eccentric and continuous path, and moving a moveable member connected to the pin to adjust a lip gap. Typically, the method include pushing a moveable member operably connected to the worm gear to decrease the lip gap, and pulling the moveable member to increase the lip gap for the material to flow. In some embodiments, the method includes moving a plurality of moveable members the same amount at the same time across a length of the extruder. Rotating the geared shaft can include keeping the geared shaft laterally stationary while the geared shaft rotates.

DETAILED DESCRIPTION

Various embodiments of the present invention will be described in detail with reference to the drawings, wherein like reference numerals represent like parts and assemblies throughout the several views. Reference to various embodiments does not limit the scope of the invention. Additionally, any examples set forth in this specification are not intended to be limiting and merely set forth some of the many possible embodiments for the claimed invention.

In general, the present disclosure relates to an extrusion die or extruder having a flexible lip. The extruder may have two flexible lips that are adjustable according to this disclosure. The position of one or two of the lips defines the thickness of the gap, which in turn affects the thickness of the resulting extrudate. The position of the flexible lip(s) is controlled by a plurality of movable members, which apply pressure to the lip(s) to modify the position of the lip(s). Each movable member includes a slot, generally extending horizontal in relation to the gap, for moveably receiving a pin therein. Each pin is rotationally and operationally connected to a gear, such as a worm gear, and is offset from the center point of the gear. Each of the gears is engaged and rotated by a rotatable shaft, such as a worm shaft. The shaft is not slideable or laterally movable, but rather, is laterally stationary within its location. In some embodiments, the shaft is composed of a plurality of smaller shafts (e.g., worm shafts) connected together.

As the shaft rotates without lateral movement, it engages and rotates at least one of the operably connected gears, preferably each of the plurality of gears. As each gear rotates, its respective pin travels in a continuous 360 degree circular path. The radius of the circular path is defined by the offset of the pin from the center of the gear. As the pin moves along its path, it transversely oscillates in the slot (e.g., it moves laterally within the slot) and simultaneously raises and lowers the operably engaged movable member. As the movable member is moved, the lip gap proximate that member decreases or increases, depending on the direction of the movement. In most embodiments, each of the plurality of moveable members moves in sync with each other.

It is well known in the field of extruders that an extruder generally includes two body halves that are joined to define a passageway therebetween for the extrusion of material, such as adhesive or other coatable or extrudable material. The lip adjustment mechanism of the present disclosure may be incorporated on one body half or both body halves, to provide an adjustable lip gap.

Figure 1:
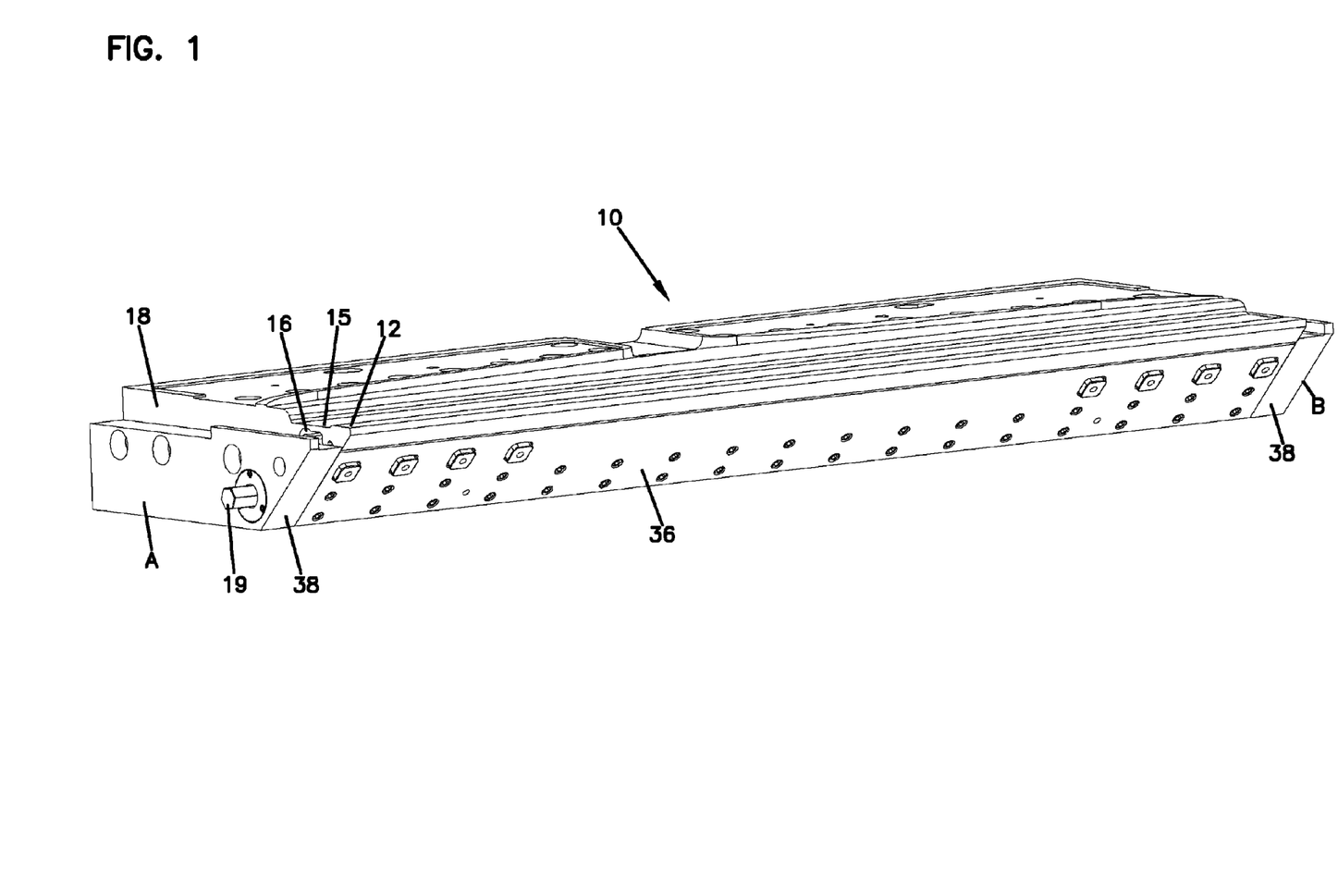
FIG. 1 is a perspective view of an extruder, with one body half, according to a possible embodiment of the present disclosure.

Referring now to the figures, a first or bottom body half of an extruder is illustrated at "10" in FIG. 1. As used herein, in some instances, body half 10 may be referred to as extruder 10. When this terminology is used, it is understood that it applies to both an entire extruder having the discussed feature or just one extruder body half 10.

In FIG. 1, a perspective view of an extruder 10 with one body half is shown. The extruder 10 has a first end A and an opposite second end B. This direction of the extruder 10, from A to B, is referred to as the length of the extruder. This direction, from A to B, is also referred to as the longitudinal direction. Movement along this direction is referred to as lateral or in the lateral direction.

The extruder 10 includes a body 18 having a flexible lip 12. The flexible lip 12 includes a hinge 15, which is defined in part by a recess 16. The hinge 15 allows movement of the flexible lip 12 relative to the body 18 of the extruder 10. The flexible lip 12 defines one side of a lip gap 17 (shown in FIG. 1A). It is the movement of the flexible lip 12 that controls the thickness of the lip gap 17 and eventually controls the thickness of the extruded material.

Figure 1A:
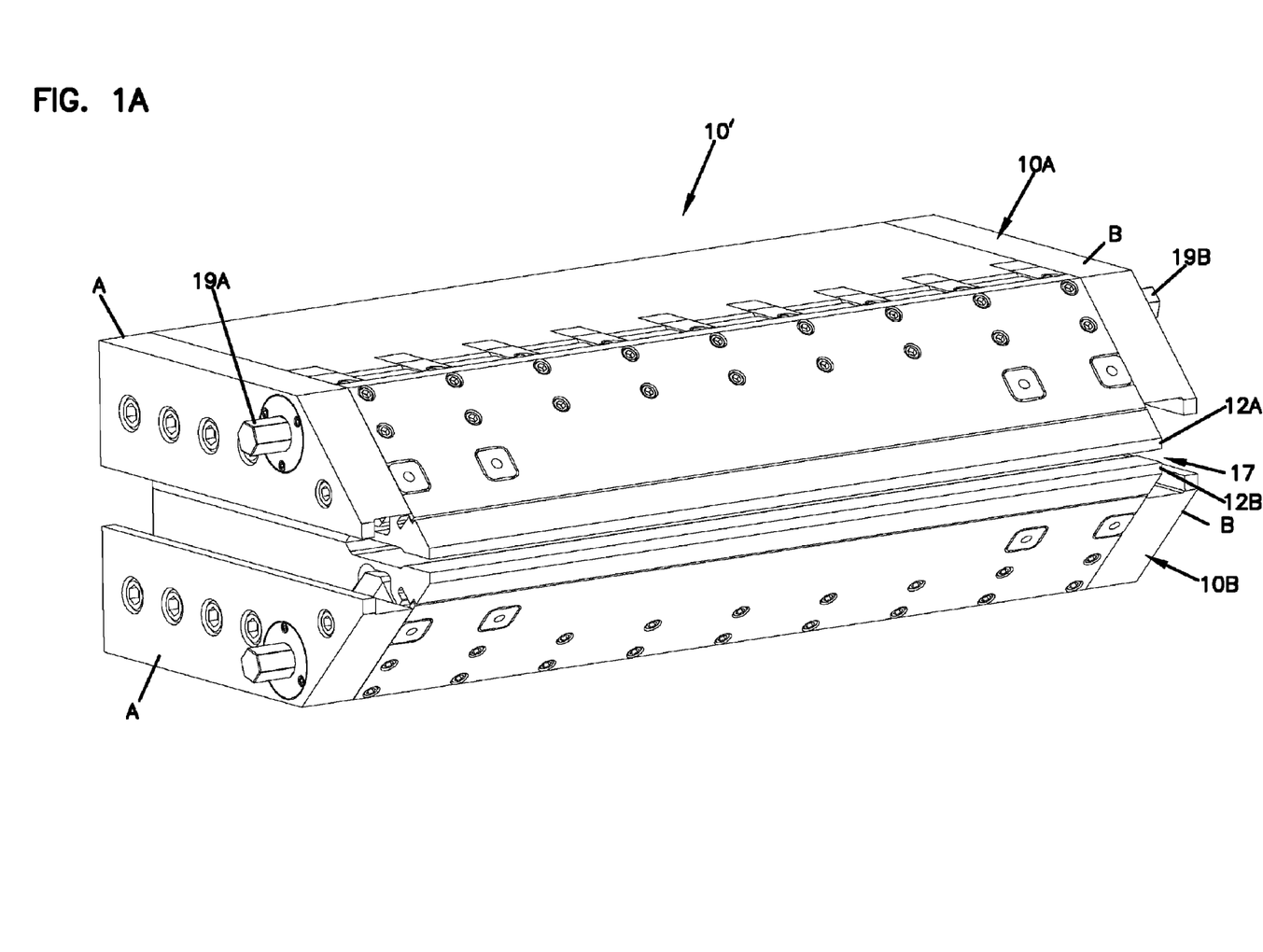
FIG. 1A is a perspective view of an extruder, with two body halves, according to a possible embodiment of the present disclosure.

Referring now to FIG. 1A, a perspective view of an extruder 10' with two body halves 10A and 10B is shown. In this figure, both the top and bottom halves 10A, 10B incorporate features of this invention. Each of extruder halves 10A, 10B has a first end A and an opposite second end B, and a lip 12A, 12B, respectively, extending from end A to end B. The lip gap 17 is defined as the gap between the two flexible lips 12A and 12B. When the position of at least one of the flexible lips 12A or 12B changes, the thickness of the lip gap 17 also changes. One or both flexible lips 12A, 12B may be used to alter the thickness of the lip gap 17.

Figure 2:
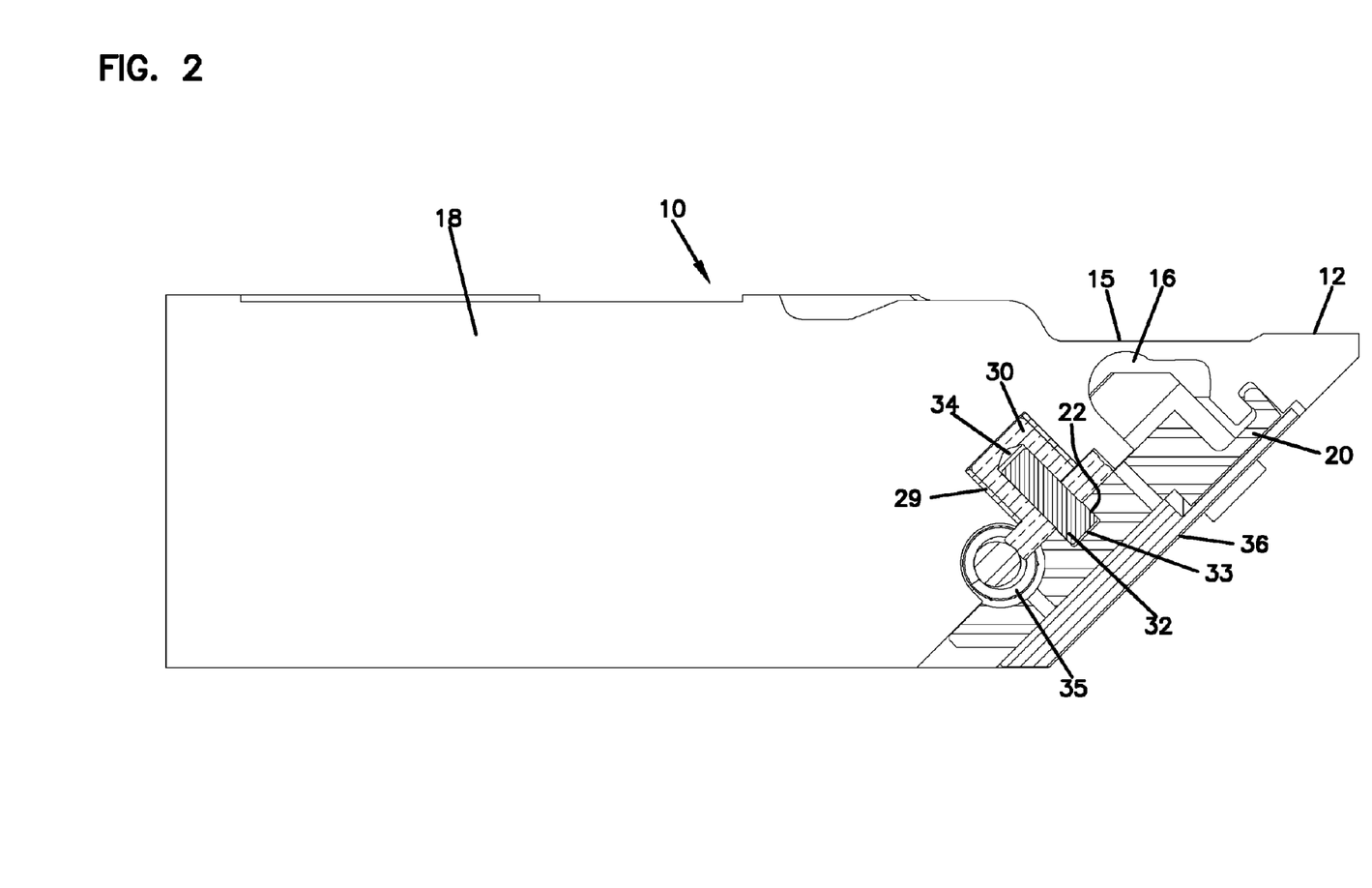
FIG. 2 is a cross-sectional side view of the extruder of FIG. 1.

Referring now to FIG. 2, a cross-sectional side view of the extruder 10 of FIG. 1 is shown. The extruder 10 includes the flexible lip 12, a moveable member 20, a pin 32, a gear 30 (e.g., a worm gear), and a shaft 35 (e.g., a worm shaft), each of which are discussed in further detail below. As provided above, the flexible lip 12 defines a one side of the lip gap 17 for the material to flow therethrough. The moveable member 20 is operably connected to the flexible lip 12 for adjustment of the lip gap 17. The moveable member 20 has a slot 22 therein, which receives a portion of the pin 32 therein. The pin 32 has a head portion 33 and an end portion 34 with the head portion 33 slideably positioned within the slot 22. In this embodiment, the head portion 33 is elongate (e.g., rectangular). The worm gear 30 includes an eccentrically positioned hole 31 which is configured to receive the pin 32, particularly the end portion 34. When engaged in the worm gear 35, the pin 32 is substantially perpendicular to the moveable member 20. The worm shaft 35, in turn, is configured to engage and rotate the worm gear 30. Preferably, a sleeve bearing 29 is included around the worm gear 30 to facilitate its rotation.

Figure 2A:
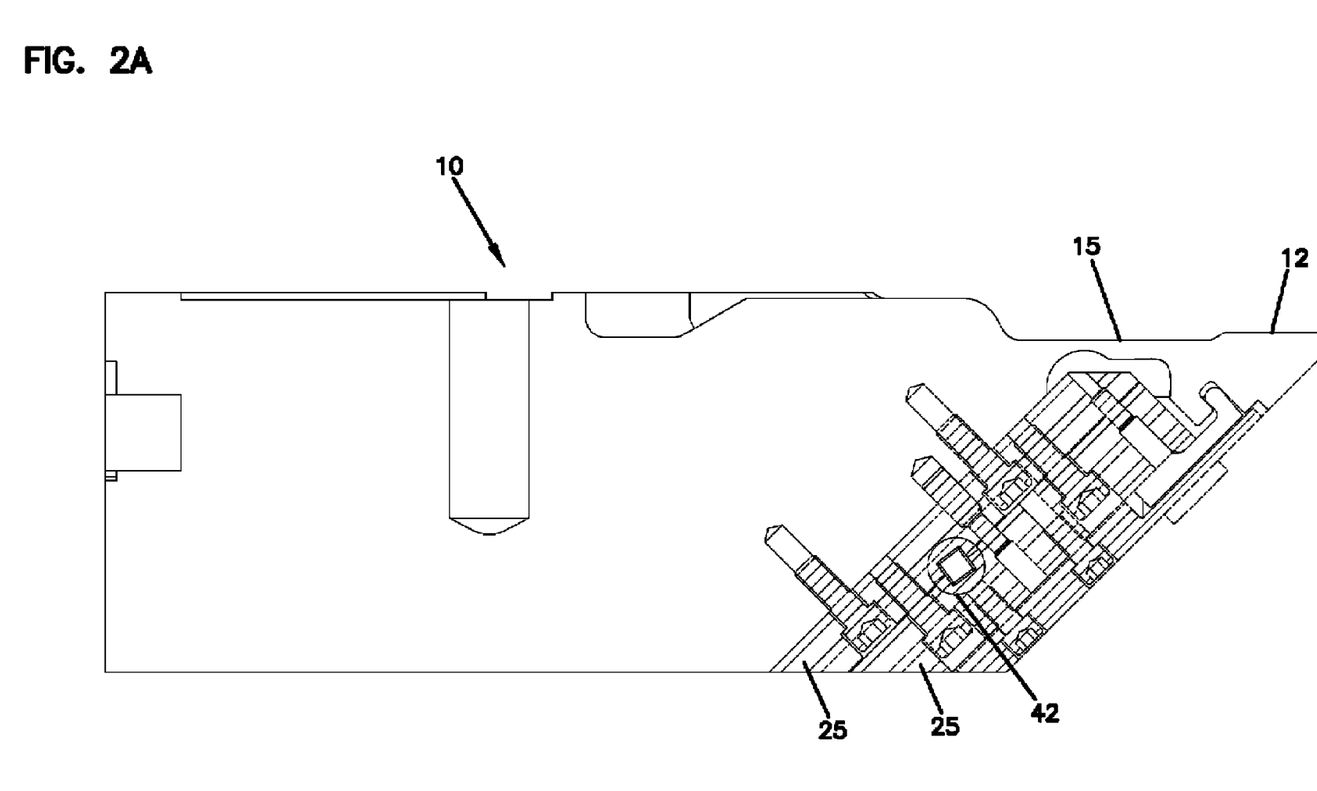
FIG. 2A is a cross-sectional side view of the extruder of FIG. 1, taken at a location different than FIG. 2.

Referring now to FIG. 2A, a cross-sectional side view of the extruder of FIG. 1 is shown, taken at a location different than FIG. 2. In this embodiment, the extruder 10 has couplers 42 connecting multiple sections of short shafts that form the overall shaft 35. That is, a plurality of short worm shafts are interconnected to provide one shaft 35 that extends generally the length of the extruder 10. Having a plurality of short shafts facilitates repair and/or removal of any worn or damaged sections.

Preferably, the worm shaft 35 does not contact the body in which it is housed, but rather, the worm shaft 35 is supported by spacers 25, which contact the recess walls.

Figure 3:
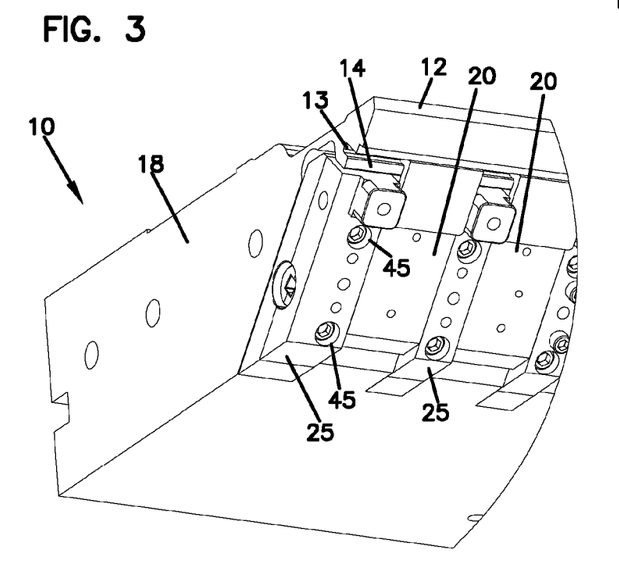
FIG. 3 is a partial interior view of a portion of the extruder according to the present disclosure.
Figure 3A:
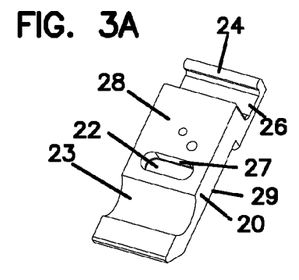
FIG. 3A is a perspective view of a moveable member from the embodiment of FIG. 3.

Referring now to FIGS. 3 and 3A, a portion of the extruder is shown, and a perspective view of a moveable member from the embodiment of FIG. 3 is shown. In this view (FIG. 3), moveable member 20 is operably connected to the flexible lip 12. In this embodiment, the moveable member 20 has a finger 24 defined by a first recess 26. When the moveable member 20 is installed in the extruder 10, the finger 24 is operably inserted into a groove 13 in body 18 that runs along the length of the flexible lip 12. The first recess 26 receives a lower portion 14 of the flexible lip 12. The moveable member 20 can perform both "push" and "pull" actions on the flexible lip 12 because of the interlock with finger 24. In particular, when the moveable member 20 pushes the flexible lip 12, the thickness of the lip gap decreases. On the other hand, when the moveable member 20 pulls the flexible lip 12, the thickness of the lip gap increases. Preferably, the groove 13 can accommodate a plurality of the fingers 24, laterally spaced along lip 12, so that the plurality of the moveable members 20 can simultaneously move lip 12 along its length.

As mentioned above, the moveable member 20 has a slot 22 therein that extends laterally across the moveable member 20. The slot 22 is configured to receive a head portion 33 of the pin 32 (not shown in FIG. 3A or 3). The slot 22 is on an interior surface 28 of the moveable member 20, when the moveable member 20 is installed in the extruder 10. The slot 22 has a length 27, which is substantially parallel to the finger 24 of the moveable member 20 and also parallel to the groove 13 of the flexible lip 12. In addition, the length 27 is typically less than the length of the moveable member 20 and does not extend the width of the moveable member 20. In other words, the slot 22 is a "closed" slot 22. Of course, in some embodiments the slot 22 can have the same length as the length of the moveable member 20, extending from edge to edge of member 22. It yet other embodiments, the slot 22 may extend to only one edge of the member 22. As discussed above, the slot 22 is on the interior surface 28 of the moveable member 20. The slot 22 typically does not extend through an external surface 29 of the moveable member 20, although in some embodiments it may extend through the external surface 29.

Still referring to FIG. 3A, the moveable member 20 has a second recess 23 on the surface 28. The second recess 23 is configured to provide clearance to and optionally partially receive the worm shaft 35 (not shown in FIG. 3A or 3). Preferably, the second recess 23 has substantially the same shape as the worm shaft 35, such as an arc or concave shape. Of course, the second recess 23 can have any suitable shape to receive the worm shaft 35. In another possible embodiment, the moveable member 20 may not include the second recess 23. Instead, the worm shaft 35 does not run through any part of the moveable member 20.

Preferably, spacers 25 are used to separate and space the moveable members 20 from each other. In this embodiment, the spacers 25 are fixedly attached to the body 18 of the extruder 10. For example, spacers 25 can be bolted to the body 18. In some embodiments, two bolts 45 are used to secure each of the spacers 25, so that the spacers 25 do not move in relation to the body 18. The spacers 25 define the areas in which the moveable members 20 are disposed. One moveable member 20 is typically located between two spacers 25. The spacers 25 generally resist any horizontal movement of the moveable members 20 yet allow a movement in a direction perpendicular to the flexible lip 12. Preferably, the plurality of the moveable members 20 and the spacers 25 are evenly and repeatedly spaced across the length of the extruder 10.

The worm gears 30 and the moveable members 20 are arranged so that the movement of the pins 32, thus the moveable members, is the same across the length of the extruder 10. In other words, each moveable member 20 preferably lifts and lowers the same amount at the same time, so that a consistent gap is achieved across the length of the extruder 10. Preferably, a cover plate 36 (shown in FIGS. 1 and 7) is provided to lock the moveable members 20 between the spacers 25.

Figure 4:
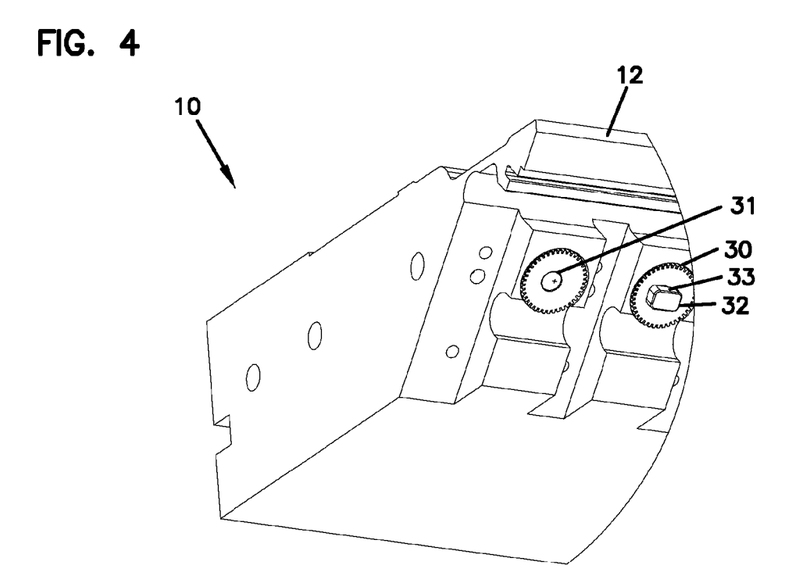
FIG. 4 is a partial interior view of a portion of the extruder, with moveable members removed, according to the present disclosure.

Referring now to FIG. 4, an interior view of a portion of the extruder with the moveable member removed is shown. The worm gear 30 includes the hole 31 which is offset from the center of the worm gear 30 and is configured to receive the pin 32 within the hole 31. The pin 32 has the head portion 33 and the end portion 34 (shown in FIG. 2), and the end portion 34 seats rotatably within the hole 31. As the worm gear 30 with the pin 32 positioned therein rotates, the pin 32 travels an eccentric and continuous path. This path has both a horizontal and a vertical vector. In other words, the pin 32 travels with both a horizontal and vertical vector at the same time.

As discussed above, the slot 22 of the moveable member 20 receives the head portion 33 of the pin 32. The slot 22 has the length 27 (shown in FIG. 3A) in a horizontal direction. Thus, as the worm gear 30 rotates, the head portion 33 applies force to the slot 22 and thus the moveable member 20 in the vertical direction. Simultaneously, the head portion 33 of the pin 32 slides unimpeded with the slot 22 in the horizontal direction. The slot 22 is configured and arranged to have the length 27 enough to hold the head portion 33 as the pin 32 travels in the eccentric and continuous path. The head portion 33 applies no horizontal force to the slot 22 and the moveable member 20 when the pin 32 moves. However, movement of the pin 33 in the vertical direction translates into the movement of the moveable member 20 at the same vertical direction. Therefore, the pin 32 raises and lowers the movable member 20 as the pin 32 oscillates in the slot 22. As the movable member 20 is raised, the lip gap 17 decreases. As the movable member 20 is lowered, the lip gap 17 increases. Typically, when the pin 32 reaches the top point of the eccentric and continuous path, the movable member 20 reaches the highest position. The thickness of the lip gap 17 thus reaches the smallest. On the other hand, when the pin 32 reaches the bottom point of the eccentric and continuous path, the movable member 20 reaches the lowest position. The thickness of the lip gap 17 thus reaches the greatest.

The circular path of the pin 32 provides a safety mechanism against over lifting the moveable member 20. In other words, because of the 360 degree path of the pin 32, the moveable member 20 has a maximum travel distance, which is dictated by the travel of pin 32 based on rotation of the worm gear 30.

An exemplary range for the thickness of the lip gap 17 is from less than about 0.001 inch to about 2 inches (about 0.025 mm to about 51 mm), although both narrower and wider gaps 17 could be accomplished. A maximum lip adjustment of about 0.135 inch (about 3.4 mm) is one example, and about 0.1 inch (about 0.25 mm) is another example. In many embodiments, the amount of movement in the lip 12 is dependent on the flexibility of hinge 15. The material that forms hinge 15 and body 18 has an effect on the flexibility.

Because the offset of the pin 32 from the center of the worm gear 30 affects the movement of the lip 12, the offset of the pin 32 can be configured according to the desired range of the thickness of the lip gap 17. For example, to obtain a movement of about 100 mil (0.1 inch) for the lip 12, the offset may be about 75 mil (0.075 inch).

Figure 5:
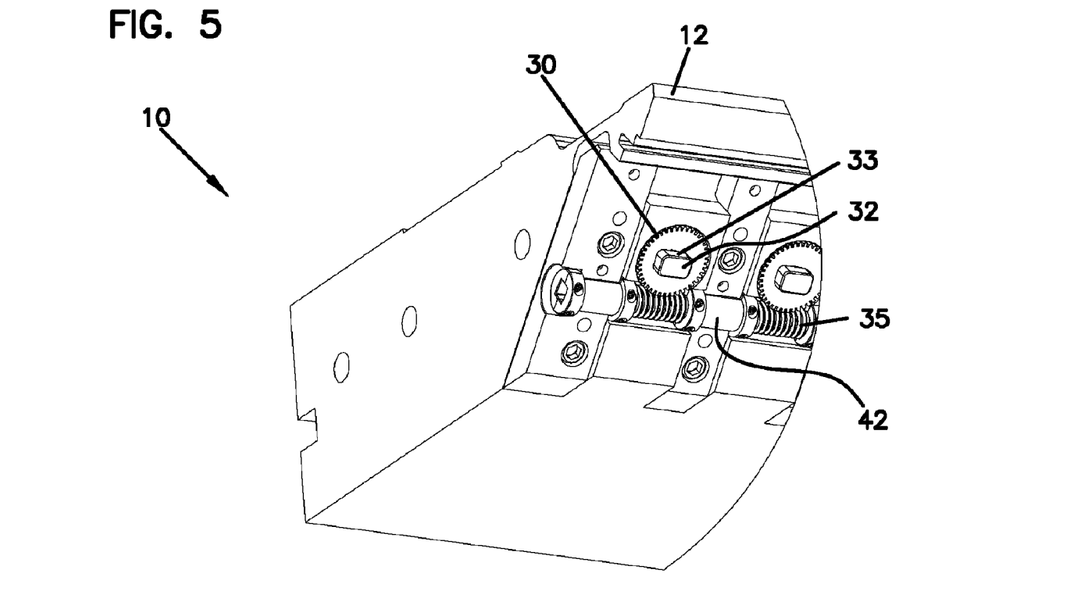
FIG. 5 is a partial interior view of a portion of the extruder illustrating a worm shaft and a worm gear according to the present disclosure.

Referring now to FIG. 5, another interior view of a portion of the extruder is shown. The rotatable worm shaft 35 is configured to engage and rotate the worm gear 30. The worm shaft 35 stays laterally stationary while it rotates. As the worm shaft 35 rotates, the operably connected worm gear 30 rotates as well. As mentioned above, in some embodiments a plurality of short worm shafts are combined to form worm shaft 35; typically, one worm gear 30 is aligned with and correspondence to one short worm shaft. The plurality of the short worm shafts are interconnected to provide one shaft 35 that extends generally the length of the extruder 10. Rotation of the shaft 35 causes each short worm shaft to engage with its respective worm gear 30 and turn the worm gear 30, thus moving the pin 32 and the moveable member 20.

Preferably, high temperature material is used to construct the worm gears 30 and shafts 35.

Figure 5A:
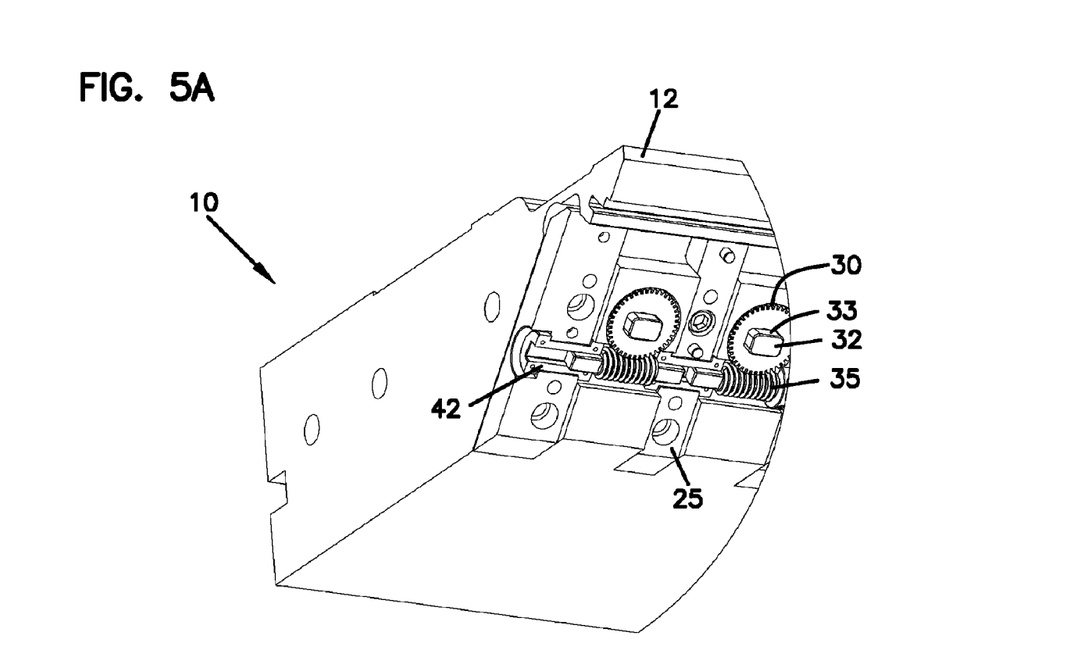
FIG. 5A is another partial interior view of a portion of the extruder illustrating a worm shaft and a worm gear according to the present disclosure.

Referring to FIG. 5A, another interior view of a portion of the extruder is illustrated. A coupler 42 is used to connect two adjacent worm shafts 35. As discussed above, the plurality of the worm shafts 35 are interconnected to provide one shaft 35 that extends generally the length of the extruder 10. Preferably, the worm shaft 35 does not contact the body in which it is housed, but rather, the worm shaft 35 is supported by the spacers 25, which contact the recess walls. The spacers 25 at each end of the extruder 10 can be configured to adjust the length of the extruder 10.

Figure 6:
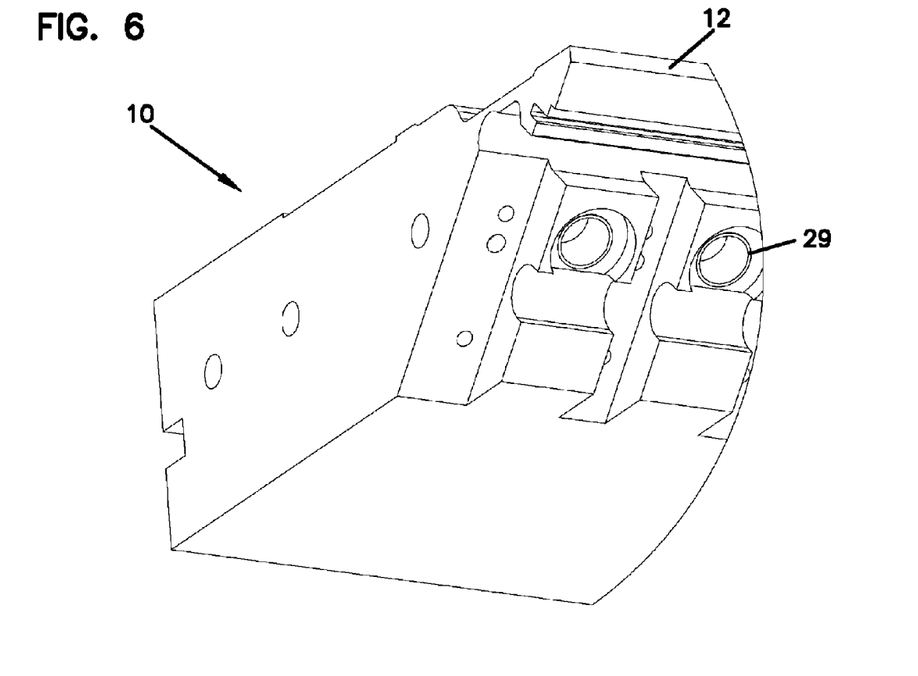
FIG. 6 is a partial interior view of a portion of the extruder of FIG. 5, with the worm shaft and worm gear removed.

Referring to FIG. 6, an interior view of a portion of the extruder of FIG. 5 is shown, with the worm shaft 35 and worm gear 30 removed. In this figure, the sleeve bearings 29 are provided to facilitate rotation of the worm gears 30.

Figure 7:
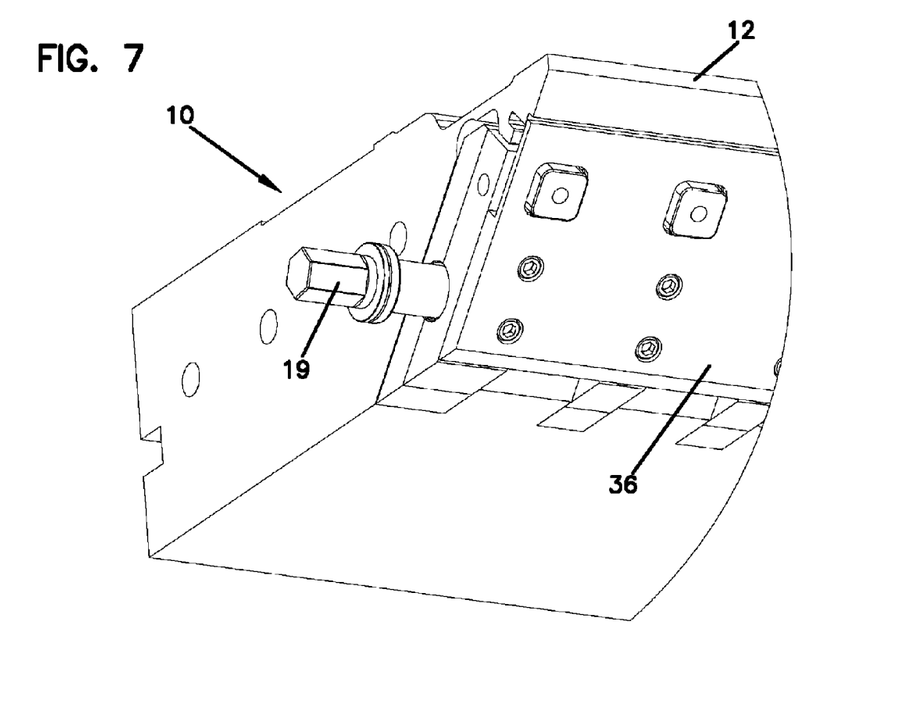
FIG. 7 is a perspective view of a portion of the extruder, almost completely assembled.

Referring to FIG. 7, a view of a portion of the extruder, almost completely assembled, is shown. The cover plate 36 is provided to lock the moveable members 20 (not visible) between spacers 25 (not visible). An adjustment spool 19 supported by a bearing is provided external to the extruder 10, typically through the end plate 38. Spool 19 is operably connected to work shaft 35 so that rotation of the adjustment spool 19 in turn rotates the shaft 35. Because of the worm gear 30 and worm shaft 35 configuration and interaction, the adjustment spool 19 is generally easy to manually rotate, often without the use of tools. Although illustrated at an end or side wall of the extruder, the adjustment spool 19 could be at a location other than the side wall or end of the extruder 10. For example, the adjustment spool 19 could be provided on the bottom surface or top surface of the extruder 10. In another embodiment, an adjustment spool 19 could be located at each end of extruder 10; see for example, extruder 10A in FIG. 1A, where a first spool 19A is illustrated at end A and a second spool 19B is illustrated at end B. Having two opposite spools eliminates the need for the operator to go to only one particular end of the extruder to adjust the lip.

The various features of the construction and operation of the lip adjusting mechanism can be readily understood from the description above and the figures. One skilled in the art of mechanical elements will readily understand the interaction of the parts without undue experimentation or research.

The invention has been described with reference to various embodiments and techniques. However, it will be apparent to one of ordinarily skill in the art that many variations and modifications may be made while remaining within the spirit and scope of the invention.

What is claimed is:

1. An extruder comprising:
   a body having a flexible lip at least partially defining a gap;
   a moveable member operably connected to the flexible lip for adjustment of the gap;
   a pin engaged with the moveable member;
   a gear configured to receive the pin offset from a center point of the gear; and
   a shaft configured to engage and rotate the gear.

2. The extruder of claim 1 wherein the moveable member comprises a slot therein, the slot receiving a head portion of the pin.

3. The extruder of claim 2 wherein the slot defines a length, the slot extending horizontally along the length.

4. The extruder of claim 2 wherein the pin comprises:
   a head portion received in the slot of the moveable member; and
   an end portion seating rotatably within a hole of the gear which is offset from the center of the gear.

5. The extruder of claim 1 further comprising:
   a plurality of moveable members; and
   spacers separating the moveable members and defining areas in which the moveable members are disposed.

6. The extruder of claim 5 wherein the spacers are attached to the body of the extruder.

7. The extruder of claim 1 further comprising a cover plate locking the moveable member.

8. The extruder of claim 1 wherein the shaft comprises a plurality of short shafts.

9. The extruder of claim 1 comprising:
   a plurality of moveable members operably connected to the flexible lip for adjustment of the gap;
   a pin engaged with each of the plurality of the moveable members;
   a plurality of gears, each configured to receive a pin offset from a center point of the gear; and
   the shaft configured to engage and rotate each of the plurality of gears.

10. The extruder of claim 9, wherein the shaft comprises a worm shaft.

11. The extruder of claim 9 wherein the shaft comprises a plurality of short shafts.

12. The extruder of claim 11, wherein each of the plurality of short shafts comprises a short worm shaft.

13. An extruder comprising:
at least one body having a first flexible lip partially defining a gap;
a plurality of moveable members operably connected to the first flexible lip for adjustment of the gap;
a plurality of pins each partially positioned within each moveable member;
a plurality of gears each configured to receive each pin which is offset from the center point of each gear; and
a geared shaft configured to engage and rotate each gear.

14. The extruder of claim 13 wherein:
each of the plurality of gears is a worm gear; and
the geared shaft is a worm shaft.

15. The extruder of claim 14, wherein the worm shaft comprise a plurality of short worm shafts.

16. An extruder comprising:
a body having a flexible lip at least partially defining a gap;
a hinge allowing movement of the flexible lip relative to the body;
a moveable member operably connected to the flexible lip for adjustment of the gap, the moveable member having a slot extending horizontally along a length;
a spacer separating the moveable member and defining areas in which the moveable member is disposed;
a pin partially positioned within the slot of the moveable member;
a worm gear configured to rotatably receive an end portion of the pin offset from the center point of the worm gear; and
a worm shaft configured to engage and rotate the worm gear; and
an adjustment spool operably connected to the worm shaft.

* * * * *